United States Patent
Field

(10) Patent No.: US 6,547,973 B2
(45) Date of Patent: *Apr. 15, 2003

(54) FABRICATION OF SUSPENDED STRUCTURES USING A SACRIFICIAL LAYER

(75) Inventor: Leslie A. Field, Portola Valley, CA (US)

(73) Assignee: Agilent Technologies, Inc., Palo Alto, CA (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/688,337

(22) Filed: Jul. 30, 1996

(65) Prior Publication Data

US 2003/0010745 A1 Jan. 16, 2003

(51) Int. Cl.$^7$ .................................................. B81R 5/00
(52) U.S. Cl. ............................... 216/2; 216/72; 216/79; 216/95; 216/97; 216/99
(58) Field of Search .............................. 216/2, 97, 99, 216/56, 72, 79, 95; 438/739, 750

(56) References Cited

U.S. PATENT DOCUMENTS

| | | | |
|---|---|---|---|
| 4,478,076 A | 10/1984 | Bohrer ........................ | 73/204 |
| 4,478,077 A | 10/1984 | Bohrer et al. ................. | 73/204 |
| 4,501,144 A | 2/1985 | Higashi et al. ............... | 73/204 |
| 4,685,331 A | 8/1987 | Renken et al. ................ | 73/204 |
| 4,784,721 A | 11/1988 | Holmen et al. ................ | 216/2 |
| 4,895,616 A | 1/1990 | Higashi et al. ............... | 438/53 |
| 4,914,742 A | 4/1990 | Higashi et al. ............... | 357/26 |
| 5,364,742 A | * 11/1994 | Fan et al. ..................... | 216/99 |
| 5,616,514 A | * 4/1997 | Michow et al. ................ | 216/2 |

OTHER PUBLICATIONS

C. H. Mastrangelo, "Thermal Application of Microbridges", Dissertation Electrical Engineering and Computer Sciences, University of California at Berkeley, 1991.

* cited by examiner

*Primary Examiner*—Gregory Mills
*Assistant Examiner*—Allan Olsen

(57) ABSTRACT

A method for fabricating a suspended structure including a layer of membrane material over a substrate. The suspended structure overlies a cavity in the substrate. The method starts by generating a sacrificial layer comprising a first material that can withstand temperatures typically encountered in subsequent conventional semiconductor processing steps. In the preferred embodiment of the present invention, the bond between sacrificial layer and the underlying substrate must be capable of withstanding temperatures greater than the Si—Al eutectic point. A layer of membrane material is then deposited over the sacrificial layer. The membrane material comprises a second material different from the first material. An opening is introduced in the layer of membrane material thereby exposing the sacrificial layer. A first etchant is applied to the sacrificial layer through the opening until the sacrificial layer is removed leaving a portion of the cavity. The first etchant is chosen such that the first etchant removes the first material more rapidly than the second material. Finally, a second etchant is introduced into the cavity to expand the cavity. The second etchant is chosen such that the second etchant removes the substrate more rapidly than the second material. The first material is preferably PSG, thermal silicon dioxide, low temperature oxide, or tungsten.

6 Claims, 2 Drawing Sheets

FABRICATION OF SUSPENDED STRUCTURES USING A SACRIFICIAL LAYER

FIELD OF THE INVENTION

The present invention relates to micromachining, and more particularly, to an improved method for constructing suspended structures such as diaphragms and membranes.

BACKGROUND OF THE INVENTION

A number of micromechanical devices include a bridge or diaphragm that is suspended over a silicon substrate. When the bridge is suspended over a substrate, the bridge is typically constructed by cutting holes in a layer that is to become the bridge and then etching the material under the bridge layer thereby leaving the bridge layer suspended. When the bridge covers a significant area, control of the undercutting, particularly the depth of the undercut, can become a significant problem.

There are two methods known to the prior art for controlling the etching of the material underlying the bridge layer. In the first method, the bridge layer is deposited on a sacrificial layer having a thickness that is equal to the height of the cavity to be left under the bridge. For example, a layer of silicon dioxide can be deposited or grown on a silicon substrate with the bridge layer deposited on the silicon dioxide. Holes are then cut in the bridge layer and the silicon dioxide layer removed utilizing an etchant that attacks the silicon dioxide much faster than the underlying silicon substrate and bridge layer. Unfortunately, there are a number of fabrication processes in which a sacrificial layer of sufficient thickness cannot be included without causing problems in the final structure or other parts of the fabrication process. In these situations, the undercut must extend into the underlying silicon substrate. Controlling the depth of the cut into the silicon substrate is difficult.

One method for controlling the undercutting of the bridge layer is taught in U.S. Pat. No. 4,895,616 to Higashi, et al. which describes the fabrication of a microbridge air flow sensor which has a sealed etched cavity beneath a silicon nitride diaphragm. The diaphragm in this system is constructed by forming a silicon nitride layer on the surface of a silicon substrate. A thin aluminum layer defines the top of the cavity. The aluminum layer is sandwiched between the silicon nitride layer and the silicon substrate. The diaphragm is created by creating a shallow cavity below the silicon nitride layer. This cavity is then extended into the underlying silicon substrate.

The aluminum sacrificial layer defines the area under the bridge layer that is to be removed. Since the aluminum can be selectively etched, a relatively small number of vias needs to be opened in the silicon nitride layer to provide sufficient access for an aluminum etchant solution to dissolve the layer leaving a narrow cavity under the silicon nitride layer. The bottom of the cavity can then be extended into the silicon substrate via a KOH etchant introduced into this cavity. This fabrication method allows a very large "pit" to be constructed under the diaphragm while minimizing the time of exposure of the diaphragm and any components thereon to the silicon etchant.

While this method represents a significant improvement over methods that do not utilize an aluminum sacrificial layer to define a narrow cavity that is later expanded, the method has one significant drawback. It is only applicable to fabrication processes that do not subject the aluminum layer to high temperatures. The aluminum layer is deposited before the membrane material and any components that are fabricated on the membrane are constructed. If any of the subsequent fabrication steps involves temperatures above the Si—Al eutectic point, the membrane integrity may be compromised. This limits processes based on aluminum sacrificial layers to temperatures of about 450° C. and below. This constraint limits the use of this method. For example, the fabrication method taught in above cited patent cannot utilize the preferred silicon nitride deposition system (LPCVD) because this deposition system requires temperatures in excess of those permitted by the aluminum sacrificial layer.

Broadly, it is the object of the present invention to provide an improved method for creating suspended structures such as membranes and the like.

It is a further object of the present invention to provide an improved method of fabricating suspended structures that does not limit the temperatures that may be utilized in the fabrication process to be less than the Si—Al eutectic point.

These and other objects of the present invention will become apparent to those skilled in the art from the following detailed description of the invention and the accompanying drawings.

SUMMARY OF THE INVENTION

The present invention comprises a method for fabricating a suspended structure including a layer of membrane material over a substrate. The suspended structure overlies a cavity in the substrate. The method starts by generating a sacrificial layer comprising a first material that can withstand temperatures typically encountered in subsequent conventional semiconductor processing steps. In the preferred embodiment of the present invention, the bond between sacrificial layer and the underlying substrate must be capable of withstanding temperatures greater than the Si—Al eutectic point. A layer of membrane material is then deposited over the sacrificial layer. The membrane material comprises a second material different from the first material. An opening is introduced in the layer of membrane material thereby exposing the sacrificial layer. A first etchant is applied to the sacrificial layer through the opening until the sacrificial layer is removed leaving a portion of the cavity. The first etchant is chosen such that the first etchant removes the first material more rapidly than the second material. Finally, a second etchant is introduced into the cavity to expand the cavity. The second etchant is chosen such that the second etchant removes the substrate more rapidly than the second material. The first material is preferably PSG or thermal silicon dioxide.

DETAILED DESCRIPTION OF THE INVENTION

Figure 1:
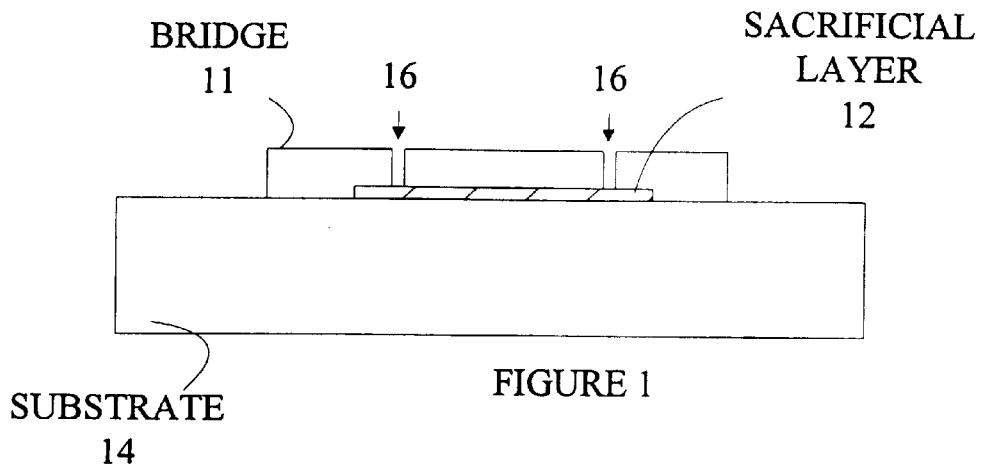
FIG. 1 is a cross-sectional view of a part having a bridge structure deposited over a sacrificial layer prior to the removal of the sacrificial layer.
Figure 2:
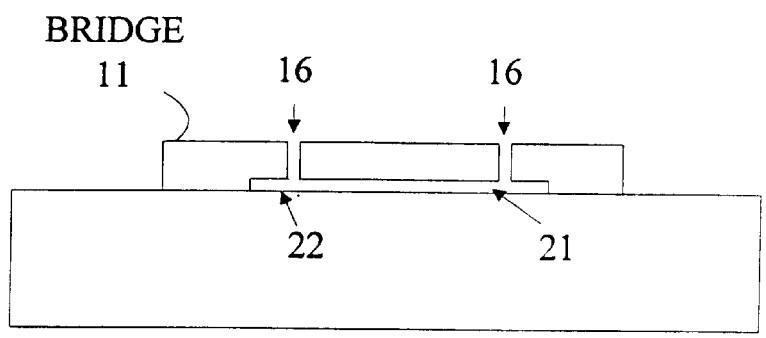
FIG. 2 a cross-sectional view of the part shown in FIG. 1 after the removal of the sacrificial layer.
Figure 3:
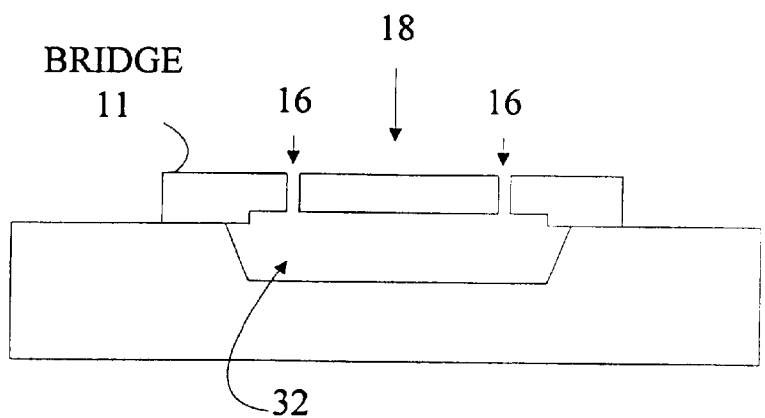
FIG. 3 is a cross-sectional view of the part shown in FIG. 2 after the etching of the underlying substrate.

The present invention avoids the problems inherent in using an aluminum sacrificial layer to create the cavity under the bridge structure by utilizing a sacrificial layer based on an oxide that can withstand high temperatures. The sacrificial layer is constructed from a material that can be rapidly etched and which can withstand high processing temperatures without compromising the integrity of the bridge layer deposited over the sacrificial layer. The present invention may be more easily understood with reference to FIG. 1 which is crosssectional view of a part having a bridge structure 11 deposited over a sacrificial layer 12 prior to the removal of the sacrificial layer. In the method of the present invention, sacrificial layer 12 comprises a high temperature oxide such as thermal silicon oxide or PSG (phosphosilicate glass) that is sandwiched between the silicon substrate 14 in which the cavity is to be etched and the bridge layer 11 that is to be suspended over the cavity. One or more slots 16 are opened in the bridge layer 11 so as to expose the sacrificial layer to an etchant applied from the top side 18 of layer 11. After the etchant has removed the sacrificial material as shown in FIG. 2, the floor 22 of the resultant cavity 21 is etched using KOH, tetramethyl ammonium hydroxide (TMAH), or the like, to generate the final cavity as shown in FIG. 3 at 32.

The present invention provides a number of advantages over systems based on creating a cavity by removing a sacrificial layer. First, the present invention allows shallower etches than would be available without a sacrificial layer. In addition, the features created are smoother than those created by anisotropic wet etching of silicon through via holes. Finally, since all of the surface area of silicon to be etched is exposed to the KOH at once, the etching step requires a significantly shorter time than would be the case if the silicon was removed by applying the etchant through vias in the layer 14 without the aid of the cavity 21.

In the preferred embodiment of the present invention, the sacrificial layer is constructed from PSG. PSG can be deposited using conventional CVD in relatively thick layers. The time needed to remove the sacrificial layer depends on the thickness of the layer. Hence, PSG is preferred over thermal silicon oxide which may only be grown in relatively thin layers. For example, PSG layers of 6 μm may be deposited using LPCVD whereas the thickest thermal oxide layers that can be practically grown are 2 μm. PSG can also withstand the temperatures encountered in most semiconductor fabrication steps. The PSG can be selectively etched using HF. PSG, thermal oxide, or low temperature oxide can be etched using HF etchants such as concentrated HF, 10:1 HF, or buffered oxide etches. The underlying silicon can then be etched using KOH, TMAH, or the like.

As noted above, the present invention can be practiced with any sacrificial layer that can be selectively removed using an etchant that selectively attacks that layer in preference to the underlying silicon and that can withstand the processing temperatures encountered between the deposition of the sacrificial layer and the etching thereof The sacrificial layer must remain bonded to the underlying substrate during the subsequent processing steps. For example, Tungsten may be used as a sacrificial layer which will withstand the temperatures needed to deposit a subsequent nitride layer by LPCVD.

Figure 4:
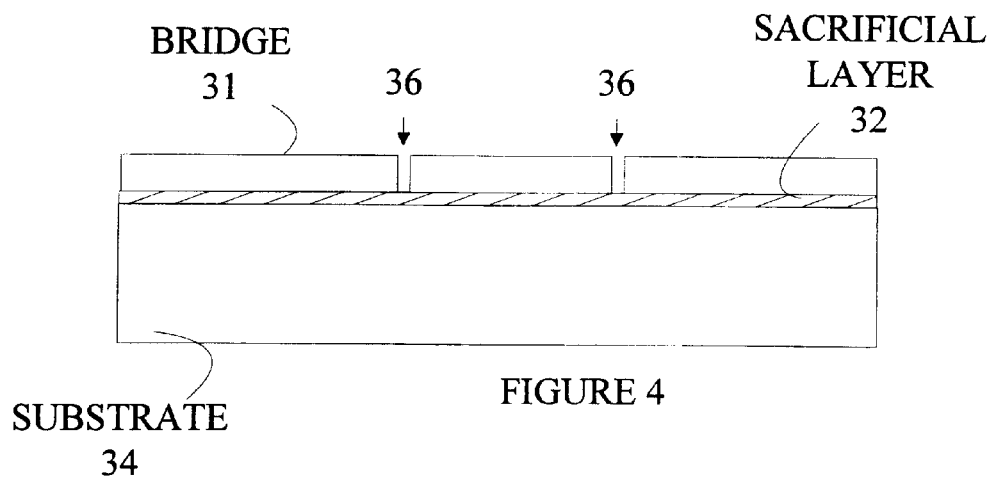
FIG. 4 is a cross-sectional view of a part having a bridge structure deposited over an unpatterned sacrificial layer prior to the removal of the sacrificial layer.
Figure 5:
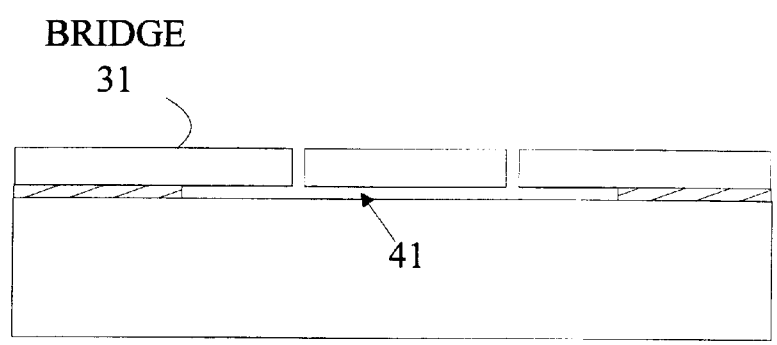
FIG. 5 a cross-sectional view of the part shown in FIG. 4 after the removal of part of the sacrificial layer.
Figure 6:
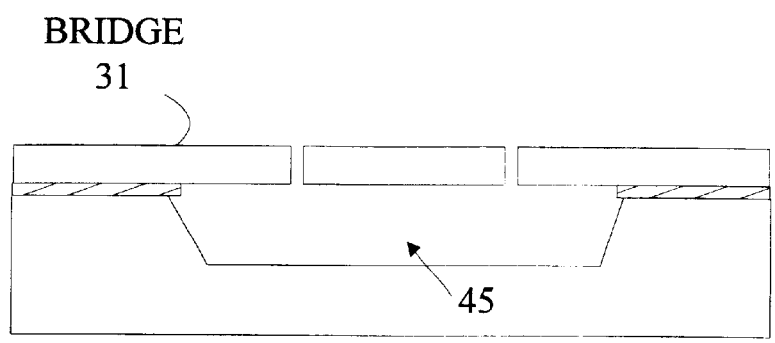
FIG. 6 is a cross-sectional view of the part shown in FIG. 5 after the etching of the underlying substrate.

The present invention can also reduce the number of masking steps needed to generate the suspended structure. Methods based on aluminum require a masking step to deposit the aluminum pad that is later removed. The present invention, in contrast, can be practiced with an unpatterned sacrificial layer. Refer now to FIGS. 4–6 which are crosssectional views of a substrate processed by the method of the present invention to provide a suspended bridge 31 over cavity 45 etched in an underlying silicon substrate. A sacrificial layer 32 is first deposited on a single crystal silicon substrate 34. The preferred sacrificial layer is PSG. A bridge layer 31 is then deposited on sacrificial layer 32 and vias 36 are etched in bridge layer 31. The location of the vias in the bridge layer is such that a timed etch by the PSG etchant will remove the portion of sacrificial layer 32 that overlies the area of substrate 34 in which cavity 45 is to be formed. The PSG etchant is then applied through vias 36 for a predetermined time to remove the underlying portion of sacrificial layer 32 to generate a cavity 41 in the PSG layer. Since the PSG etchant does not attack the underlying silicon significantly during the PSG etching step, the resultant cavity is substantially the same as would be obtained by removing a patterned sacrificial layer. The bottom of cavity 41 is then extended into the substrate by applying a silicon etch such as KOH through vias 36. Since the silicon etch only slowly etches the PSG layer, the cavity is extended with little change in the PSG layer. The final cavity 45 is shown in FIG. 6.

Various modifications to the present invention will become apparent to those skilled in the art from the foregoing description and accompanying drawings. Accordingly, the present invention is to be limited solely by the scope of the following claims.

What is claimed is:

1. A method for fabricating a suspended structure comprising a layer of membrane material over a substrate, said suspended structure overlying a cavity in said substrate, said method comprising the steps of:

generating a sacrificial layer comprising a first material that will remain bonded to said substrate at a temperature greater than 450° C.;

depositing said layer of membrane material over said sacrificial layer, said membrane material comprising a second material different from said first material;

opening at least one via in said layer of membrane material thereby exposing said sacrificial layer;

applying a first etchant to said sacrificial layer through said via to remove part of said sacrificial layer and leave a portion of said sacrificial layer to provide an etch cavity having a periphery bounded by said remaining portion of said sacrificial layer, said first etchant being chosen such that said first etchant removes said first material more rapidly than said second material; and introducing a second etchant into said etch cavity, said second etchant being chosen such that said second etchant removes said substrate more rapidly than said second material.

2. The method of claim 1 wherein said first material is phosphosilicate glass.

3. The method of claim 1 wherein said first material is thermal silicon dioxide.

4. The method of claim 1 wherein said first material comprises an oxide that can be etched with HF or a buffered oxide etch.

5. The method of claim 1 wherein said substrate is a single crystal silicon wafer.

6. The method of claim 1 wherein said first material is tungsten.

* * * * *